United States Patent [19]

Brandner et al.

[11] Patent Number: 5,180,610

[45] Date of Patent: Jan. 19, 1993

[54] METHOD FOR MANUFACTURING A LUMINESCENT STORAGE SCREEN HAVING A PHOPHOR WHICH IS TRANSPARENT TO READ-OUT RADIATION

[75] Inventors: Gerhard Brandner, Zirndorf; Tanja Wegerer, Erlangen, both of Fed. Rep. of Germany

[73] Assignee: Siemens Aktiengesellschaft, Munich, Fed. Rep. of Germany

[21] Appl. No.: 653,950

[22] Filed: Feb. 12, 1991

Related U.S. Application Data

[62] Division of Ser. No. 419,784, Oct. 11, 1989, abandoned.

[30] Foreign Application Priority Data

Nov. 15, 1988 [EP] European Pat. Off. ........ 88119043.3

[51] Int. Cl.$^5$ ................................................ B05D 5/06
[52] U.S. Cl. ................................. 427/64; 427/255.2; 427/294; 427/369; 427/370; 427/377; 427/379
[58] Field of Search ...................... 427/64, 255.2, 294, 427/369, 370, 377, 379

*Primary Examiner*—Bernard Pianalto
*Attorney, Agent, or Firm*—Hill, Van Santen, Steadman & Simpson

[57] ABSTRACT

A luminescent storage screen, in which a latent x-ray image is stored, is read-out using stimulating radiation at a first wavelength, which causes light at a second wavelength to be emitted by the screen. The stimulable phosphor is transparent in the range of the two wavelengths. The stimulable phosphor is a doped alkali halide, such as a thallium-doped rubidium-bromide.

7 Claims, No Drawings

METHOD FOR MANUFACTURING A LUMINESCENT STORAGE SCREEN HAVING A PHOPHOR WHICH IS TRANSPARENT TO READ-OUT RADIATION

This is a division, of application Ser. No. 419,784, filed Oct. 11, 1989, abandoned.

BACKGROUND OF THE INVENTION

1. Field of the Invention

The present invention is directed to a luminescent storage screen suitable for storing a latent x-ray image, and in particular to a storage screen having a phosphor which is transparent in selected wavelength regions.

2. Description of the Prior Art

Luminescent storage screens are generally known in the art which consist of a stimulable phosphor in which a latent x-ray image is stored. Read-out of such stimulable phosphor screens is undertaken by exciting the phosphor of the screen with radiation at a first wavelength, thereby causing the screen to emit light at a second wavelength. Such a stimulable phosphor is disclosed, for example, in European application 0 174 875.

The use of such stimulable phosphors in an image pick-up device in a x-ray diagnostics installation is described, for example, in German patent 174 875, corresponding to U.S. Pat. No. 31847. In this known x-ray diagnostics installation, a luminescent storage screen, including a stimulable phosphor of the type described above, is irradiated with x-radiation which is attenuated by an examination subject. The stimulable phosphor serves as a radiation-sensitive transducer. As a result of the irradiation, electronic holes are generated in the phosphor, corresponding to the incident radiation intensity. These holes are stored in traps having a higher energy level, so that a latent x-ray image is thereby stored in the screen.

During read-out, the entire surface of the storage screen is caused to luminesce pixel-by-pixel by a separate radiation source such as, for example, a laser. The energy levels of the holes in the traps are boosted by the stimulating radiation, and thus fall back into lower energy levels, with the energy difference emitted in the form of light quanta. As a result, the stimulable phosphor emits light dependent on the energy stored in the phosphor. The light emitted due to the stimulation radiation is detected and converted into a visible image, so that the x-ray image stored in the screen can be read-out.

A problem in known stimulable phosphors used for this purpose is that the phosphor is not sufficiently transparent to the laser light. A minimum thickness of the stimulable phosphor is required to achieve adequate absorption of the x-ray quanta. In the case of a non-transparent, tightly compressed or sintered phosphor, the laser beam is so greatly attenuated by the phosphor that the penetration depth of the laser beam is very low. As the laser beam penetrates the phosphor, it relatively quickly reaches a depth at which its energy is no longer sufficient to boost the electronic holes to the energy level required for emission, so that the information stored in the deeper layers of the screen can not be read-out.

A storage screen is described in the aforementioned European application 0 174 87 wherein the grains of the phosphor of the storage screen are applied on a base enveloped by a binder. The binder serves to fix the phosphor grains. A light-transmissive carrier material is usually used as the binder, the carrier material being transparent both for the stimulating laser light and the emitted luminescent light. A problem still arises in that the laser beam spreads with increasing penetration depth in the phosphor, due to scatter caused by the phosphor grains, so that the modulation transfer function of the overall system is degraded. Compared to a layer consisting only of stimulable phosphor, a storage screen constructed in the binder technique having the same thickness, has a lower x-ray quantum absorption.

SUMMARY OF THE INVENTION

It is an object of the present invention to provide a storage luminescent screen of the type described above which has a high x-ray quantum absorption with high image sharpness and good modulation transfer function. The above object is achieved in accordance with the principles of the present invention in a storage screen having a stimulable phosphor which is transparent. It is thus not necessary to apply the stimulable phosphor to the carrier together with a binder. Given the same x-ray quantum absorption, a lower layer thickness can be used, so that the scanning stimulation beam is still unattenuated, even at a large penetration depth. Moreover, the material is optically isotropic and homogeneous. In particular, the material does not exhibit any modification of the refractive index over the entire layer thickness. These characteristics result in the stimulating radiation beam exhibiting only a slight spread as it passes through the stimulable phosphor, so that the sharpness of the image and thus the modulation transfer function, are considerably improved.

DESCRIPTION OF THE PREFERRED EMBODIMENTS

It is preferable that the stimulable phosphor be transparent at a first wavelength, which is the wavelength of the stimulation radiation, and at a second wavelength, which is the wavelength of the emitted light. A doped alkali halide such as an alkali halide doped with at least one lanthanide or a thallium-doped rubidium-bromide stimulable phosphor, is suitable as the stimulable phosphor.

The stimulable phosphor of the invention is preferably manufactured by vapor-deposition in a high vacuum, and is subsequently re-tempered in a protective gas atmosphere up to temperatures slightly below the melting point of the phosphor. The above-described properties of the stimulable phosphor can alternatively be achieved by pressing the stimulable phosphor on a substrate while the phosphor is being heated and/or is in a vacuum. It is preferable that the stimulable phosphor be heated to about 100° C. through about 400° C. in a vacuum under a first pressure of, for example, about 5 through about 10 MPa, with the pressure being briefly elevated to a second pressure of, for example, about 300 through about 3,000 MPa, preferably about 1,000 MPa when the temperature is reached.

As stated above, the initial material for the storage luminescent screen according to the principles of the invention is applied on a carrier by vapor-deposition in a high vacuum. Alkali halides, particularly rubidium-bromide doped with thallium-bromide (RbBr:Tl), are particularly suitable as the initial materials. Subsequently the storage screen in retempered in a protective gas atmosphere up to a temperature slightly below the melting point of the phosphor. A dense, binder-free stimulable phosphor which is transparent to light in the wavelength range between 380nm and 780nm is obtained.

The storage screen may alternatively be manufactured by pressing a doped alkali halide, on a carrier while the stimulable phosphor is being heated and/or in a vacuum. A storage luminescent having stimulable phosphors transparent for optical light can be manufactured in thickness greater than 500µm when rubidium-bromide doped with thallium-bromide is heated to about 100° C. through about 400° C. in an evacuatable press form under a vacuum at a press of about 5 through about 10 MPa. As soon as the desired temperature is reached, the press is increased to about 300 through about 3,000 MPa, preferably about 1,000 MPa, for a few minutes. The transparent product thus obtained is hygroscopic and must therefore be protected against moisture. This can be accomplished by applying a transparent protective layer on the phosphor as a moisture barrier.

A stimulable phosphor is achieved in the manner described above which has a continuous, although not necessarily fault-free, mono-crystal lattice. It is important that the alkali halide single crystals be transparent in the wavelength range of visible light. Moreover, no boundary surfaces at which the refractive index changes should occur over the entire layer thickness. Such boundary surfaces, such as may be caused by trapped air bubbles, result in scattering and thus degrade the quality of the image.

Although modifications and changes may be suggested by those skilled in the art, it is the intention of the inventors to embody within the patent warranted hereon all changes and modifications as reasonably and properly come within the scope of their contribution to the art.

We claim as our invention

1. A method for manufacturing a transparent stimulable phosphor for use in a luminescent storage screen comprising the steps of:
   vapor-depositing a stimulable phosphor in a high vacuum on a carrier; and
   re-tempering the vapor-deposited stimulable phosphor under a protective gas atmosphere up to a temperature slightly less than the melting point of the stimulable phosphor.

2. A method for manufacturing a transparent stimulable phosphor for use in a luminescent storage screen comprising the steps of:
   pressing a stimulable phosphor on a carrier under elevated temperature.

3. A method for manufacturing a stimulable phosphor as claimed in claim 2, wherein the step of pressing is further defined by pressing said stimulable phosphor on said carrier under elevated temperatures and in a vacuum.

4. A method for manufacturing a transparent stimulable phosphor by pressing a stimulable phosphor on a carrier in a vacuum.

5. A method for manufacturing a stimulable phosphor as claimed in claim 4, wherein the step of pressing is further defined by pressing said stimulable phosphor on said carrier in a vacuum at a temperature in a range of from about 100° C., through about 400° C. under a first pressure and briefly elevating the pressure to a second pressure when a selected temperature within said range is reached.

6. A method for manufacturing a stimulable phosphor as claimed in claim 5, wherein said first pressure is in the range of from about 5 through about 10 MPa and said second pressure is in the range of from about 300 through about 3,000 MPa.

7. A method as claimed in claim 6, wherein said second pressure is about 1,000 MPa.

* * * * *

UNITED STATES PATENT AND TRADEMARK OFFICE
CERTIFICATE OF CORRECTION

PATENT NO. : 5,180,610
DATED : Jan. 19, 1993
INVENTOR(S) : Gerhard Brandner and Tanja Wegerer It is certified that error appears in the above—identified patent and that said Letters Patent is hereby corrected as shown below:

On the title page, item [54] and in column 1, line 3, in which the word "PHOSPHOR" was misspelled as "PHOPHOR".

Signed and Sealed this

Thirtieth Day of November, 1993

Attest:

BRUCE LEHMAN

Attesting Officer

Commissioner of Patents and Trademarks